(12) United States Patent
Jonsson

(10) Patent No.: US 10,632,874 B2
(45) Date of Patent: Apr. 28, 2020

(54) DEVICE FOR REDUCTION OF VERTICAL PEAK ACCELERATION

(71) Applicant: Ningbo Geely Automobile Research & Development Co., Ltd., Ningbo (CN)

(72) Inventor: Tony Jonsson, Alingsås (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 0 days.

(21) Appl. No.: 16/211,397

(22) Filed: Dec. 6, 2018

(65) Prior Publication Data
US 2019/0106027 A1   Apr. 11, 2019

Related U.S. Application Data

(63) Continuation of application No. PCT/CN2017/087478, filed on Jun. 7, 2017.

(30) Foreign Application Priority Data

Jun. 9, 2016   (EP) .................................... 16173774

(51) Int. Cl.
*B60N 2/42*      (2006.01)
*B60N 2/58*      (2006.01)
(Continued)

(52) U.S. Cl.
CPC ........... *B60N 2/4242* (2013.01); *B60N 2/427* (2013.01); *B60N 2/5825* (2013.01);
(Continued)

(58) Field of Classification Search
CPC .... B60N 2/4242; B60N 2/427; B60N 2/5825; B60N 2/7035; B60N 2/7094; B64D 11/0619
(Continued)

(56) References Cited

U.S. PATENT DOCUMENTS

| 4,712,834 A | 12/1987 | Warrick |
| 6,086,097 A | 7/2000 | Van Wynsberghe |

(Continued)

FOREIGN PATENT DOCUMENTS

| CN | 204263969 U | 4/2015 |
| CN | 104691375 A | 6/2015 |
| GB | 1523303 A | 8/1978 |

OTHER PUBLICATIONS

International Search Report and Written Opinion from corresponding International Application No. PCT/CN2017/087478, dated Aug. 25, 2017, 8 pages.

(Continued)

*Primary Examiner* — Anthony D Barfield
(74) *Attorney, Agent, or Firm* — Tucker Ellis LLP

(57) ABSTRACT

The present invention relates to a vehicle seat system for reduction of vertical peak acceleration of a person seated in a vehicle seat during impact. The vehicle seat system comprises a seating structure and a trim at least partially enclosing the seating structure. The trim is releasably fastened to the seating structure by means of interconnected trim fastening means comprising at least two parts adapted to release from each other when the vertical peak acceleration exceeds a predetermined limit value, subsequently reducing the vertical peak acceleration. The present invention further relates to a vehicle comprising the vehicle seat system.

11 Claims, 2 Drawing Sheets

(51) Int. Cl.
*B60N 2/70* (2006.01)
*B64D 11/06* (2006.01)
*B60N 2/427* (2006.01)

(52) U.S. Cl.
CPC ......... *B60N 2/7035* (2013.01); *B60N 2/7094* (2013.01); *B64D 11/0619* (2014.12)

(58) Field of Classification Search
USPC ...................................................... 297/216.1
See application file for complete search history.

(56) References Cited

U.S. PATENT DOCUMENTS

| | | | |
|---|---|---|---|
| 7,311,356 B2 * | 12/2007 | Pudney | B60R 7/043 |
| | | | 297/216.1 |
| 8,746,792 B2 | 6/2014 | Ruthinowski | |
| 9,056,560 B2 * | 6/2015 | Perrin | B60N 2/24 |
| 2004/0113474 A1 * | 6/2004 | Lambrecht | B60N 2/067 |
| | | | 297/344.1 |
| 2012/0126591 A1 | 5/2012 | Ruthinowski | |
| 2013/0229038 A1 | 9/2013 | Marshall | |

OTHER PUBLICATIONS

Extended European Search Report from corresponding European Patent Application No. 16173774.7, dated Dec. 7, 2016, 7 pages.

* cited by examiner

DEVICE FOR REDUCTION OF VERTICAL PEAK ACCELERATION

RELATED APPLICATION DATA

This application is a continuation of International Patent Application No. PCT/CN2017/087478, filed Jun. 7, 2017, which claims priority from European Application No. 16173774.7, filed Jun. 9, 2016, the disclosures of which are incorporated herein by reference in their entireties.

TECHNICAL FIELD

The present invention relates to a vehicle seat system for reduction of the vertical peak acceleration of a person seated in a vehicle seat during impact, and a vehicle comprising said vehicle seat system.

BACKGROUND OF THE INVENTION

In prior art, it is well known to provide solutions for enhancing passenger safety during vehicle accidents. The vehicle interior serves a crucial role in protecting any individuals travelling in the vehicle, and solutions for protecting these individuals comprise, i.e., airbags, seatbelts, and padded surfaces.

Other protective solutions relate to the enhancement and improvement of vehicle seats, wherein safety is enhanced by means of padding and/or features such as whiplash protection and airbags mounted in the vehicle seat. However, such features are mostly directed towards reducing horizontal forces, such as those arising through frontal collision. It is desirable to also reduce any vertical forces exerted on the individual.

One solution for reducing vertical force is disclosed in US 2013/229038, mainly related to military vehicles. The vehicle seat in this document comprises a seat pan having a folded portion, the folded portion being such that it unfolds and thereby absorbs at least a part of the vertical force during collision. The seat pan is made out of a metal sheet, resulting in a quite uncomfortable seat unsuitable for use in civilian vehicles.

Yet another solution for reducing vertical force is disclosed in U.S. Pat. No. 8,746,792, wherein a vehicle seat is provided with energy absorbing means in one or two regions. One kind of energy absorbing means comprises energy absorbing foam arranged between a vehicle seat structural cross member and the vehicle seat comfort foam. A further energy absorbing means comprises a suspension system wherein longitudinal wires extend between front and rear cross members, one end of each wire being resiliently attached to the rear cross member by means of a deformable element configured to absorb energy by facilitating deflection of the wire during collision.

SUMMARY OF THE INVENTION

It is an object of the present invention to mitigate the above problems, and to provide an arrangement which is reliable, simple to manufacture and use, and which is cost effective. According to a first aspect of the present invention, these objects are achieved by a vehicle seat system for reduction of vertical peak acceleration of a person seated in a vehicle seat during impact, the vehicle seat system comprising a seating structure and a trim at least partially enclosing the seating structure, the trim being releasably fastened to the seating structure by means of interconnected trim fastening means, the interconnected trim fastening means comprising at least two parts adapted to release from each other when the vertical peak acceleration exceeds a predetermined limit value, subsequently reducing the vertical peak acceleration.

Such a solution provides a simple, reliable and cost effective way of reducing vertical forces acting on an individual travelling in a vehicle during collision. The solution does not require much space within the vehicle, and it is essentially invisible to the vehicle user. Further, the use of a releasable trim does not significantly impact material costs, manufacturing methods, or assembly time. In one embodiment, the seating structure comprises at least one first frame section, at least one second frame section, and a support carpet extending between the first and second frame sections, and the interconnected trim fastening means comprises at least one fixation support bar attached to the first frame section, and at least one fixation hook, a first end of the fixation hook being attached to a first side of the support carpet. The use of interconnected trim fastening means comprising two parts, i.e. a fixation hook and a fixation support bar, which are adapted to release from each other provides a solution which is easily attached to existing vehicle seat components without significantly affecting the function of, or the space required for, these components.

The first side of the support carpet may be an underside, allowing the fixation hook to be easily attached to the support carpet.

Further, the support carpet may comprise a flexible structure extending between the first frame section and the second frame section, wherein the first end of the fixation hook is attached to the flexible structure. This solution works well together with existing seat configurations, and facilitates attachment of the fixation hook to the support carpet.

The flexible structure may comprise a plurality of springs and at least one cross member extending perpendicularly to the direction of the springs, allowing the fixation hook to be easily attached to the cross member.

The first frame section may comprise a tube, a first end of the fixation support bar being attached to the wall of the tube and a second end of the fixation support bar being attached to the trim, providing a cheap solution which does not require complex components and which is easy to install.

In one embodiment, the second end of the fixation hook extends into a second, curved end of the fixation support bar, subsequently interconnecting the fixation support bar and the fixation hook, fastening the trim to the seating structure in a manner which is stable yet simple.

In a further embodiment, the second end of the fixation support bar extends into a second, curved end of the fixation hook, subsequently interconnecting the fixation support bar and the fixation hook, fastening the trim to the seating structure in a manner which is stable yet simple.

In one embodiment, the first end of the fixation support bar is arranged at an underside of the tube.

Further, the fixation hook may be adapted to, when the vertical peak acceleration exceeds the predetermined limit value, move at least partially in a direction towards the tube, subsequently releasing the second end of the fixation support bar from the second end of the fixation hook, allowing the second end of the fixation support bar to rotate in relation to the first end of the fixation support bar. This solution fixates the fixation support bar to the tube, providing extra stability when attaching the trim to the seating structure.

In a further embodiment, the first end of the fixation support bar is arranged at an upper side of the tube.

Further, the fixation hook may be adapted to, when the vertical peak acceleration exceeds the predetermined limit value, move at least partially in a direction from the tube, subsequently releasing the second end of the fixation support bar from the second end of the fixation hook, allowing the fixation support bar to rotate in relation to the tube. This solution allows the fixation support bar to rotate in relation to the tube, ensuring that the trim moves and also allowing larger trim movement.

Rotation of the fixation support bar may allow the trim to move a distance along the periphery of the tube, subsequently allowing the trim to move in the direction of vertical acceleration and reducing the value of the vertical peak acceleration in a reliable, cost effective, and simple manner.

The distance may be >20 mm.

According to a second aspect of the present invention, these objects are achieved by a vehicle comprising the above mentioned vehicle seat system. Generally, all terms used in the claims are to be interpreted according to their ordinary meaning in the technical field, unless explicitly defined otherwise herein. All references to "a/an/the [element, device, component, means, etc.]" are to be interpreted openly as referring to at least one instance of said element, device, component, means, etc., unless explicitly stated otherwise. Further, by the term "comprising" it is meant "comprising but not limited to" throughout the application.

BRIEF DESCRIPTION OF THE DRAWINGS

This and other aspects of the present invention will now be described in more detail, with reference to the appended drawings showing currently preferred embodiments of the invention.

DETAILED DESCRIPTION OF THE INVENTION

The present invention is intended to be used primarily in cars. However, the invention may advantageously be used in any kind of vehicle, military or civilian, such as trucks, busses, airplanes, or helicopters. The invention relates to a seat which minimizes vertical peak acceleration during impacts such as those encountered in some motor vehicle accidents. Furthermore, the invention may also be used to reduce the vertical peak acceleration arising in airplane/helicopter crashes, in crashes related to explosions under the undercarriage of a vehicle, etc.

Conventional vehicle dampers strike through at approximately 3 G, while impacts, such as those described above, generate up to 12-15 G. Hence, there is a significant difference in the value of vertical acceleration depending on if the vehicle passes over a speed bump or if it is involved in an accident.

The above mentioned vertical peak acceleration, and the corresponding force, is related to the vehicle first moving in a vertical direction towards the ground, i.e. in the negative Z-direction, and a subsequently experiencing a sudden stop. The peak acceleration/force, which the present invention aims to minimize, is a reactionary force in the Z-direction, i.e., in a direction opposite to the direction of gravitational force. Such a reactionary force in the Z-direction, applied by the vehicle seat onto its user during impact, can put large stress on the user's spine. Hence, an object of the present invention is to decrease the risk of spinal injuries during roll-over or accidents where the vehicle ends up at a level which is lower than street level, for example in a ditch.

The term impact is used to describe short term, high kinetic energy. A shock pulse can be measured by its peak acceleration in G-s and by the pulse duration. Acceleration equals velocity/time, and vertical peak acceleration may subsequently be reduced by extending the duration of the shock.

The terms collision, crash, and accident are herein used as interchangeable terms for a situation different from a normal driving state of the vehicle and wherein there is a risk for injury of the vehicle user(s). By user is meant a vehicle driver or passenger.

A vehicle seat usually comprises a back portion and a seat portion, one end of the back portion being pivotally connected to one end of the seat portion. The seat portion comprises a seating structure, foam or other padding material used to increase the comfort of the user, and trim which at least partially encloses both seating structure and foam. The trim is made of fabric, leather, or any other suitable material.

Figure 1:
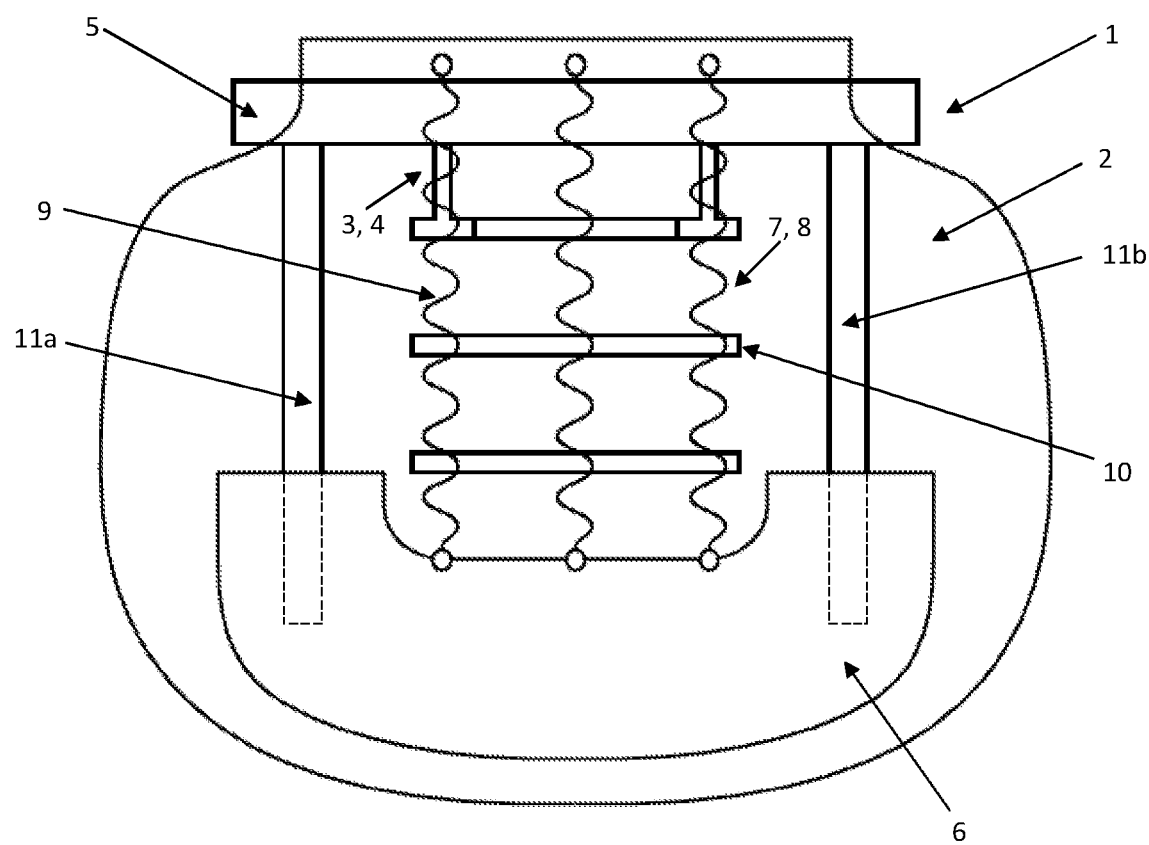
FIG. 1 shows a schematic view from above of the embodiments of the present invention.

As shown in FIG. 1, the seating structure 1 comprises of at least one first frame section 5 and at least one second frame section 6, e.g. a rear frame section 5 and a front frame section 6. The rear and front frame sections may be connected, at respective ends, by two side frame sections 11a, b, extending perpendicular to the rear 5 and front 6 frame sections, such that the four frame sections together form an essentially rectangular frame. By rear is meant a part arranged essentially towards the back of the vehicle, i.e., the area where the above mentioned back portion is connected to the seat portion, and by front is meant a part arranged essentially towards the front of the vehicle.

The seating structure 1 further comprises a support carpet 7 which extends between the rear 5 and front 6 frame sections, in the same direction as the side frame sections 11a, b. The support carpet 7 preferably comprises a flexible structure 8, used for absorbing movement in order to provide a comfortable ride for the user. In a preferred embodiment, the flexible structure 8 comprises a plurality of springs 9 extending between the rear 5 and front 6 frame sections, and at least one cross member 10, extending perpendicularly to the direction of the springs 9 and being attached to each spring in order to stabilise the springs and add additional support to the flexible structure 8. The previously mentioned foam is preferably located between the trim 2 and the flexible structure 8, i.e. underneath the trim and above the flexible structure.

The rear frame section 5 preferably comprises of a stiff tube, such as a circular metal tube with a diameter of approximately 30-35 mm. The tube 5 is, at each end, connected to one of the above mentioned side frame sections 11a, b The front 6 and side 11 frame sections preferably comprise of U-section steel.

The trim 2 surrounding the seating structure 1 is, at one end, attached to the underside of the front frame section 6. The opposite end of the trim 2 is releasably fastened to the seating structure 1 by means of interconnected trim fastening means 3, 4 which preferably comprises of two parts adapted to connect to, and release from, each other, i.e. a fixation support bar 3 and a fixation hook 4 which have a certain stiffness and which extend into each other. One end of the fixation support bar is designed to connect with one end of the fixation hook, the very same ends being adapted to release from each other when vertical peak acceleration exceeds a predetermined limit value, as will be described more in detail below.

The first end 3a of the fixation support bar is attached to the wall of the tube 5, and the rest of the fixation support bar 3 extends tangentially to the tube 5, from its attachment point and towards the centre of the seating structure. The second, opposite end 3b of the fixation support bar is a free end located farther from the tube 5 than its first end 3a. The fixation support bar 3 is preferably made of plastic, but any stiff material such as metal can be used. The fixation support bar 3 is preferably a separate component fitted to the peripheral wall of the tube 5, but it could also be manufactured integrally with the tube. As mentioned above, one end of the trim 2 is attached to the interconnected trim fastening means. More specifically, the trim 2 is attached to the second, free end 3b of the fixation support bar, subsequently fastening the trim 2 to the seating structure 1.

The first end 4a of the fixation hook is attached to a first side 7a of the support carpet, preferably the underside of the support carpet 7, i.e., the side facing the undercarriage of the vehicle. More specifically, the first end 4a of the fixation hook is preferably attached to one of the cross members 10 of the support carpet 7. The rest of the fixation hook 4 extends at an angle from the support carpet 7, partially in a direction towards the centre of the seating structure 1 and partially in a direction towards the undercarriage of the vehicle. The second, opposite end 4b of the fixation hook is a free end. The fixation hook 4 is preferably made of plastic, but any stiff material such as metal can be used.

The interconnection between the fixation support bar 3 and the fixation hook 4 is adapted to release when the vertical peak acceleration of the person sitting in the vehicle seat exceeds a predetermined limit value. At release, the trim 2 is moved vertically, along with the seated person, subsequently reducing the vertical peak acceleration by extending the duration of the impact, i.e. the time to full strike through of the seated person to the absolute bottom of the vehicle seat. Interconnection, and release, of the interconnected trim fastening means 3, 4 is achieved by means of one of two preferred embodiments, described below, in which the interconnection of the interconnected trim fastening means 3, 4 releases in response to the force exerted upon the seat, and its user, in the Z-direction.

Figure 2:
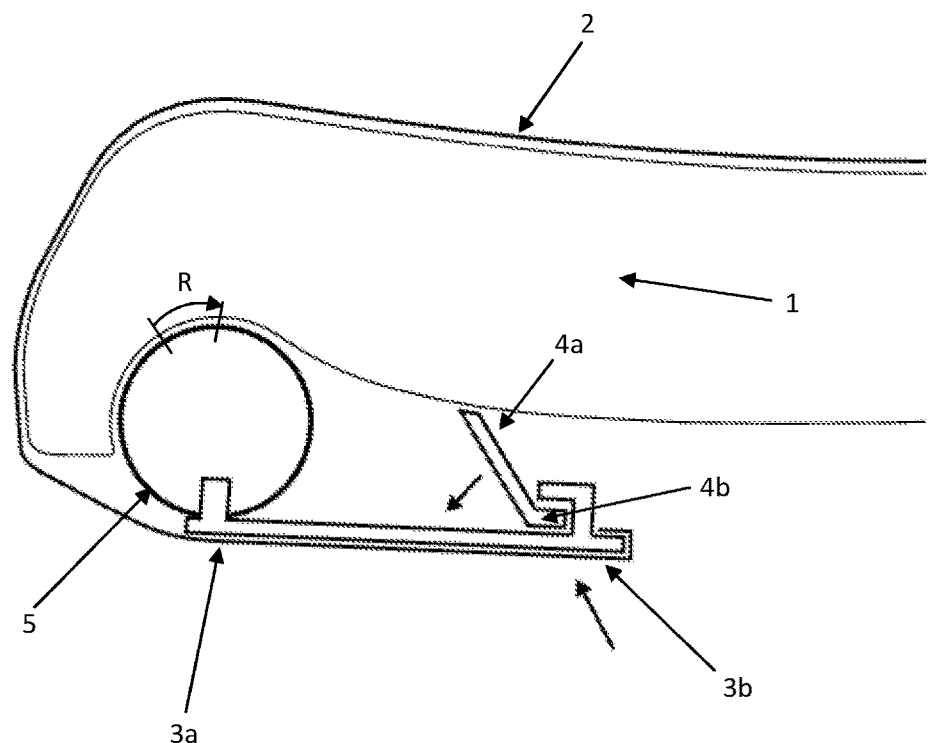
FIG. 2 shows a cross sectional side view of a first embodiment according to the present invention.

In a first preferred embodiment, shown in FIG. 2, the first end 3a of the fixation support bar is fixed to a lower section of the tube wall, lower meaning the section of the horizontally extending tube 5 which is located closest to the undercarriage of the vehicle. The fixation hook 4 is adapted to, when the vertical peak acceleration exceeds the predetermined limit value, move in response to movement of the support carpet 7. The essentially stiff fixation hook 4 moves partially downwards and partially in a direction towards the tube 5, i.e. in a direction towards the rear of the vehicle seat. The second, free end 4b of the fixation hook slides out of the hook shaped, second end 3b of the fixation support bar, and is subsequently released. This allows the second, now free, end 3b of the essentially stiff fixation support bar to rotate in relation to its first, fixed end 3a. The rotation is of a magnitude such that the trim 2 is allowed to move a distance R, >20 mm, along the periphery of the tube 5, which allows the trim 2 located underneath a vehicle user to move in the vertical direction, subsequently reducing the value of the vertical peak acceleration on the user.

The fixation support bar 3 may be pre-stressed when it is interconnected with the fixation hook 4. In this case, the fixation support bar 3 not only releases from the hook, but also springs back in a direction from the fixation hook 4 towards the rear of the vehicle seat. The springing motion/rotation could be considered to cause a first trim movement, and the fact that the second end 3b is free causes a second, main trim movement, all of the trim movement in the vertical direction being a result of the vertical acceleration. The movement of the free second end 3b increases in relation to the magnitude of the vertical acceleration. When the fixation support bar 3 is not pre-stressed, only the second, main trim movement takes place.

Figure 3:
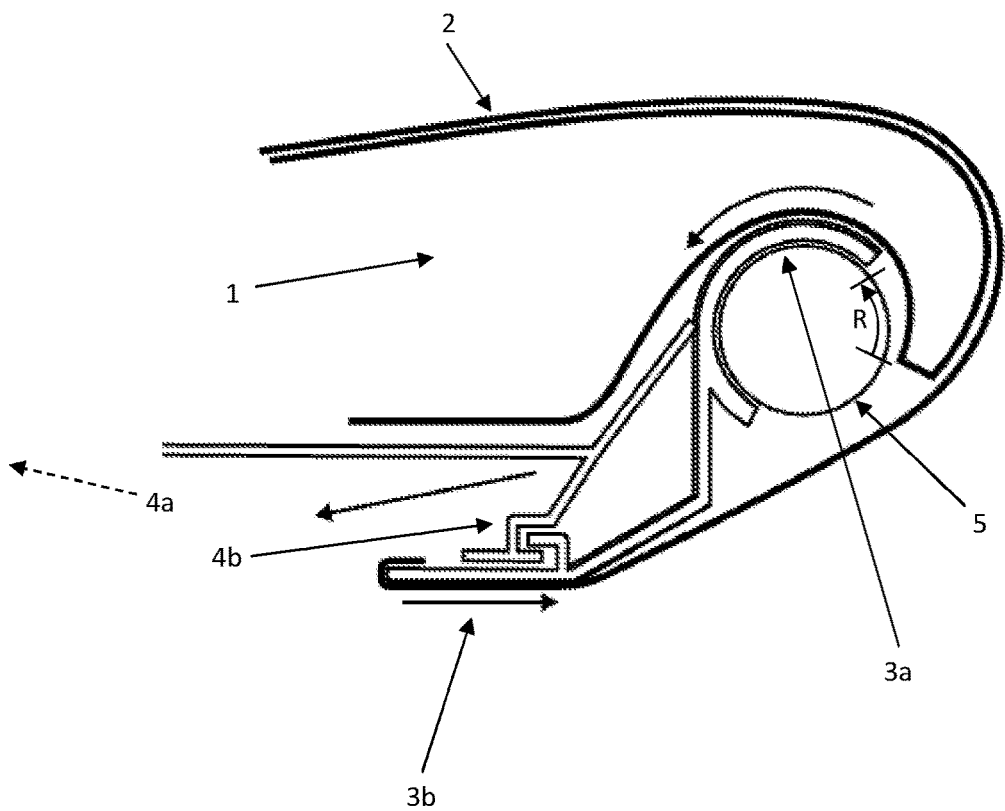
FIG. 3 shows a cross sectional side view of a second embodiment according to the present invention.

In a second preferred embodiment, shown in FIG. 3, the first end 3a of the fixation support bar is arranged at an upper side of the tube 5. The first end 3a has a semi-circular arc shape which corresponds to the peripheral shape of the tube 5, and this first end 3a is placed on top of the horizontally extending tube 5 in direct abutment with the tube wall, and is attached to the tube 5 such that it can rotate around the tube but not be easily removed from it. The fixation hook 4 is adapted to, when the vertical peak acceleration exceeds the predetermined limit value, move in response to movement of the support carpet 7. The essentially stiff fixation hook 4 moves partially downwards and partially in a direction from the tube 5, i.e. in a direction towards the front of the vehicle seat. The second, free end 3b of the fixation support bar slides out of the hook shaped, second end 4b of the fixation hook, and is subsequently released. This allows the essentially stiff fixation support bar 3 to rotate in relation to the tube 5, i.e. the fixation support bar 3 rotates, in its entirety, a distance R, >20 mm, along the periphery of the tube 5. The rotation/release of the fixation support bar 3 allows the trim 2 located underneath a vehicle user to move in the vertical direction in response to vertical acceleration, subsequently reducing the value of the vertical peak acceleration on the user.

The trim 2, in both embodiments, is stretched at least partially around the seating structure 1, from its attachment point at the front frame section 6, across the upper side of the seating structure 1, to its other attachment point at the underside of the support carpet 7. As previously mentioned, foam or other padding is arranged on the upper side of the support carpet 7. When the seating structure 1 is provided with foam/padding, the padding will be compressed to allow the trim 2 to move in the vertical direction.

Further embodiments of interconnected trim fastening means 3, 4 comprise a combination of one stiff, fixed part and one releasable, elastic part; two Velcro fastening strips; or a breakable seam or weld.

One advantage of arranging the interconnected trim fastening means towards the rear of the vehicle seat is that the weight centre of the user is located at the rear of the seat.

The person skilled in the art realizes that the present invention by no means is limited to the preferred embodiments described above. On the contrary, many modifications and variations are possible within the scope of the appended claims. For example, the flexible structure could have different designs, such as that of a carpet or a thread structure. Further, any suitable kind of material may be used for the individual components. Also, the present invention could be used to reduce the effects of any kind of vertical impact on a seat and its user.

The invention claimed is:

1. A vehicle seat system for reduction of vertical peak acceleration of a person seated in a vehicle seat during impact, said vehicle seat system comprising a seating structure and a trim at least partially enclosing said seating structure, said trim being releasably fastened to the seating structure by means of interconnected trim fastening means,
said interconnected trim fastening means comprising at least two parts adapted to release from each other when the vertical peak acceleration exceeds a predetermined limit value, subsequently reducing said vertical peak acceleration, wherein said seating structure comprises at least one first frame section, at least one second frame section, and a support carpet extending between the first and second frame sections, and
wherein said interconnected trim fastening means comprises at least one fixation support bar attached to said first frame section, and at least one fixation hook, a first end of said fixation hook being attached to a first side of said support carpet,
wherein
said first frame section comprises a tube, and wherein a first end of the fixation support bar is attached to the wall of the tube and a second end of the fixation support bar is attached to the trim, wherein said second end of the fixation hook extends into a second, curved end of the fixation support bar, subsequently interconnecting the fixation support bar and the fixation hook, and wherein said second end of the fixation support bar extends into a second, curved end of the fixation hook, subsequently interconnecting the fixation support bar and the fixation hook.

2. A vehicle seat system according to claim 1, wherein said first side of the support carpet is an underside.

3. A vehicle seat system according to claim 1, wherein said support carpet comprises a flexible structure extending between the first frame section and the second frame section, wherein said first end of the fixation hook is attached to said flexible structure.

4. A vehicle seat system according to claim 3, wherein said flexible structure comprises a plurality of springs and at least one cross member extending perpendicularly to the direction of said springs.

5. A vehicle seat system according to claim 1, wherein said first end of the fixation support bar is arranged at an underside of the tube.

6. A vehicle seat system according to claim 5, wherein said fixation hook is adapted to, when the vertical peak acceleration exceeds the predetermined limit value, move at least partially in a direction towards the tube, subsequently releasing the second end of the fixation support bar from the second end of the fixation hook, allowing the second end of the fixation support bar to rotate in relation to the first end of the fixation support bar.

7. A vehicle seat system according to claim 6, wherein said rotation allows the trim to move a distance along the periphery of the tube, subsequently allowing said trim to move in the direction of vertical acceleration and reducing the value of the vertical peak acceleration.

8. A vehicle seat system according to claim 7, wherein said distance is >20 mm.

9. A vehicle seat system according to claim 1, wherein said first end of the fixation support bar is arranged at an upper side of the tube.

10. A vehicle seat system according to claim 9, wherein said fixation hook is adapted to, when the vertical peak acceleration exceeds the predetermined limit value, move at least partially in a direction from the tube, subsequently releasing the second end of the fixation support bar from the second end of the fixation hook, allowing the fixation support bar to rotate in relation to the tube.

11. A vehicle comprising a vehicle seat system according to claim 1.

* * * * *